United States Patent
Shin et al.

(10) Patent No.: US 7,752,410 B1
(45) Date of Patent: Jul. 6, 2010

(54) SYSTEM AND METHOD FOR ACCESSING DATA IN A MULTICYCLE OPERATIONS CACHE

(75) Inventors: Jin-Uk Shin, San Jose, CA (US); Effendy Kumala, Plano, TX (US)

(73) Assignee: Oracle America, Inc., Redwood City, CA (US)

( * ) Notice: Subject to any disclaimer, the term of this patent is extended or adjusted under 35 U.S.C. 154(b) by 354 days.

(21) Appl. No.: 11/035,594

(22) Filed: Jan. 14, 2005

(51) Int. Cl.
*G06F 12/00* (2006.01)
*G06F 13/00* (2006.01)
*G06F 13/28* (2006.01)

(52) U.S. Cl. ..................................... 711/167
(58) Field of Classification Search ................. 711/119, 711/118, 114
See application file for complete search history.

(56) References Cited

U.S. PATENT DOCUMENTS

| | | | |
|---|---|---|---|
| 4,312,630 A * | 1/1982 | Travaglini | 425/568 |
| 4,599,708 A | 7/1986 | Schuster | |
| 5,062,081 A | 10/1991 | Runaldue | |
| 5,603,006 A * | 2/1997 | Satake et al. | 711/132 |
| 5,742,180 A * | 4/1998 | DeHon et al. | 326/40 |
| 5,752,259 A * | 5/1998 | Tran | 711/125 |
| 5,841,304 A | 11/1998 | Tam | |
| 5,844,856 A | 12/1998 | Taylor | |
| 5,900,759 A | 5/1999 | Tam | |
| 5,901,103 A * | 5/1999 | Harris et al. | 365/226 |
| 5,953,284 A * | 9/1999 | Baker et al. | 365/233 |
| 6,101,135 A | 8/2000 | Lee | |
| 6,138,206 A * | 10/2000 | Fisher et al. | 711/118 |
| 6,275,437 B1 | 8/2001 | Kim et al. | |
| 6,320,794 B1 | 11/2001 | Kang et al. | |
| 6,393,512 B1 * | 5/2002 | Chen et al. | 711/5 |
| 6,438,023 B1 * | 8/2002 | Johnson | 365/154 |
| 6,584,531 B1 * | 6/2003 | Singh | 710/244 |
| 6,864,600 B2 * | 3/2005 | Malinovitch | 307/70 |
| 2003/0005225 A1 * | 1/2003 | Smits | 711/119 |

OTHER PUBLICATIONS

Sedra et al., Microelectronic Circuits, 2004, Oxford Press, $5^{th}$ edition, 5 pages.*
Stewart, Robert W. Lecture slides entitled "Digital Logic Review", Jan. 2004. Retrieved from http://www.eee.strath.ac.uk/r.w.stewart/digital/logic_review.pdf.
Kaplan et al. Hands-on Electronics: A One semester Course for Class Instruction or Self-study. Published: 2003. Cambridge University Press. pp. 125-136.
U.S. Appl. No. 11/021,497, filed Dec. 23, 2004, Liu et al.

* cited by examiner

*Primary Examiner*—Christian P Chace
*Assistant Examiner*—Gary W Cygiel
(74) *Attorney, Agent, or Firm*—Martine Penilla & Gencarella, LLP (57) ABSTRACT

A hardware implemented method for accessing data in a multicycle operations cache is provided. In this hardware implemented method, a request to access the data in a sub-bank of the multicycle operations cache is received. If the sub-bank is accessed in a previous, consecutive clock cycle, then the request to access the data in the sub-bank is ignored. Else, if the sub-bank is not accessed in the previous, consecutive clock cycle, then the data is allowed to be accessed in the sub-bank. A memory chip and a system for accessing data in the multicycle operations cache also are described.

15 Claims, 7 Drawing Sheets

SYSTEM AND METHOD FOR ACCESSING DATA IN A MULTICYCLE OPERATIONS CACHE

BACKGROUND OF THE INVENTION

1. Field of the Invention

This invention relates generally to computer memory and, more particularly, to system and method for accessing data in a multicycle operations cache.

2. Description of the Related Art

As on-chip memory size continues to increase with technology scaling, the increase in the size of a cache memory also increases access time of data in the cache memory because longer data lines are used. Thus, data that typically takes only one clock cycle to access may take up to two clock cycles to access in a large cache memory. Accordingly, in a large cache memory, data access may take multiple clock cycles. The problem with accessing data in a multicycle operations cache is that a traditional memory controller may issue an access request at every single clock cycle. If a request is made while the cache memory is still servicing a prior request, the data accessed becomes corrupted as the accessing of the data is interrupted by the subsequent request. The memory controller can be designed to issue the data request based on an array latency, but this approach creates multi-cycle paths in the memory controller which makes timing and functional variations difficult and error prone.

Furthermore, the power consumption of large cache memories, such as level-1 (L1) cache, level-2 (L2) cache, level-3 (L3) cache, etc., during an idle state becomes an important factor of total power consumption. For example, excessive power consumptions by cache memories become particularly troublesome during wafer testing because a full power supply is not available.

As a result, there is a need to provide system and method to access data in a multicycle operations cache without access data corruption, and to minimize power consumption of cache memories.

SUMMARY OF THE INVENTION

Broadly speaking, the present invention fills these needs by providing system and hardware implemented method for accessing data in a multicycle operations cache. It should be appreciated that the present invention can be implemented in numerous ways, including as a method, a system, or a device. Several inventive embodiments of the present invention are described below.

In accordance with a first aspect of the present invention, a hardware implemented method for accessing data in a multicycle operations cache is provided. In this hardware implemented method, a request to access the data in a sub-bank of the multicycle operations cache is received. If the sub-bank is accessed in a previous, consecutive clock cycle, then the request to access the data in the sub-bank is ignored. Else, if the sub-bank is not accessed in the previous, consecutive clock cycle, then the data is allowed to be accessed in the sub-bank.

In accordance with a second aspect of the present invention, a memory chip having circuitries for accessing data in a multicycle operations cache is provided. The memory chip includes circuitry for receiving a first request to access a first data in a sub-bank of the multicycle operations cache during a first clock cycle and circuitry for accessing the first data in the sub-bank. Additionally included in the memory chip is circuitry for receiving a second request to access a second data in the sub-bank during a second clock cycle. Also included is circuitry for blocking the second request to access the second data in the sub-bank until the accessing of the first data in the sub-bank is completed if the first and second clock cycles are two consecutive clock cycles, and circuitry for accessing the second data in the sub-bank if the first and second clock cycles are not consecutive.

In accordance with a third aspect of the present invention, a system for accessing data in a multicycle operations cache is provided. The system includes a positive edge triggered flip-flop having a first input to receive sub-bank addresses and a second input to receive a cache clock. The system additionally includes an array control logic generator of a sub-sub-array of a sub-bank in communication with the positive edge triggered flip-flop to receive a block enable signal. Here, the block enable signal is configured to select whether to enable or to disable the array control logic generator.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for system and hardware implemented method for accessing data in a multicycle operations cache. It will be obvious, however, to one skilled in the art, that the present invention may be practiced without some or all of these specific details. In other instances, well known process operations have not been described in detail in order not to unnecessarily obscure the present invention.

The embodiments described herein provide system and hardware implemented method for accessing data in a multicycle operations cache. In one embodiment, to conserve power, circuitry is included to disable a sub-bank if the sub-bank is not accessed. Furthermore, with the use of a positive edge triggered flip-flop and a negative edge triggered flip-flop, a request to access data in a sub-bank is ignored if the sub-bank is accessed in a previous, consecutive clock cycle.

Otherwise, if the sub-bank is not accessed in a previous, consecutive clock cycle, then the data in the sub-bank is allowed to be accessed.

Figure 1:
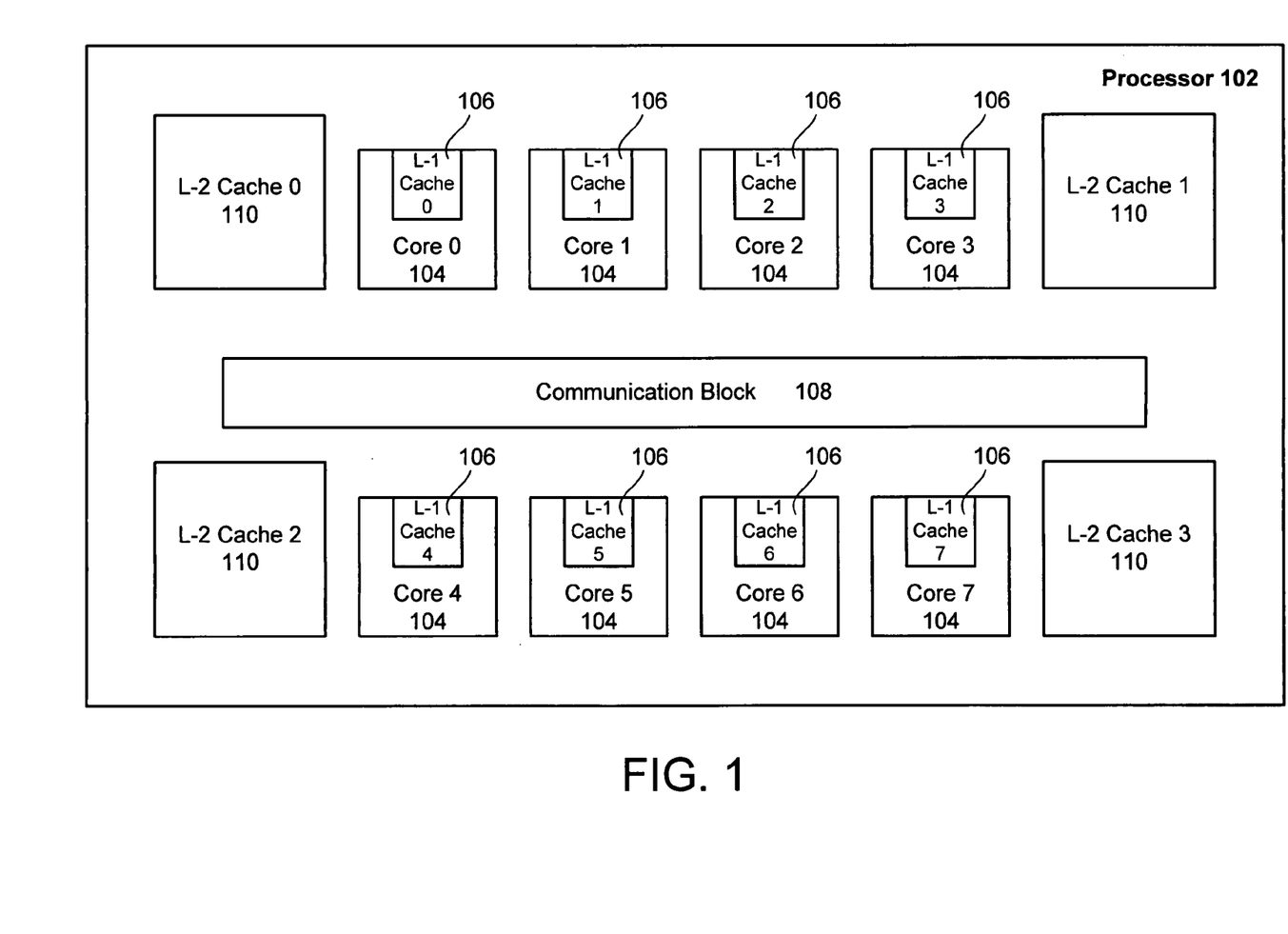
FIG. 1 is a simplified block diagram of a high level system overview of a processor, in accordance with one embodiment of the present invention.

FIG. 1 is a simplified block diagram of a high level system overview of a processor, in accordance with one embodiment of the present invention. As shown in FIG. 1, processor 102 includes multiple processor cores 104, level-1 (L1) caches 106, level-2 (L2) caches 110, and communication block 108. One skilled in the art will appreciate that cache memory, such as L1 caches 106 and L2 caches 110, is random access memory (RAM) that processor 102 can access more quickly than off-chip stand alone RAM. For instance, as processor 102 accesses data, the processor looks first in L1 caches 106 and L2 caches 110, and if the processor finds the data there (from a previous reading of data), the processor does not have to do the more time-consuming reading of data from the off-chip stand alone RAM.

L1 caches 106 are on the same chip as processor 102, and are typically built onto each processor core 104. As shown in FIG. 1, L2 caches 110 are also built onto processor 102. However, it should be appreciated that L2 caches 110 may also be located on a separate chip (e.g., an expansion card). It should also be noted that communication block 108 facilitates communication between processor cores 104 and L2 caches 110.

Figure 2:
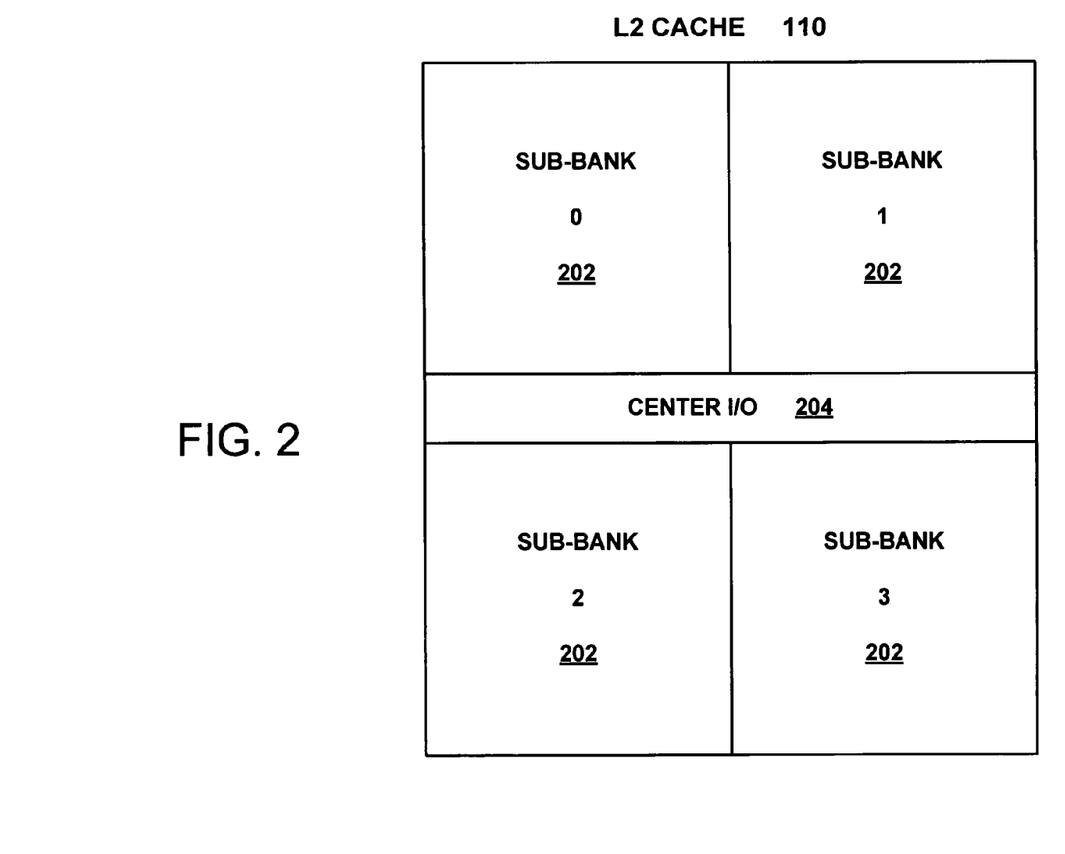
FIG. 2 is a more detailed block diagram of the L2 cache shown in FIG. 1, in accordance with one embodiment of the present invention.

FIG. 2 is a more detailed block diagram of the L2 cache shown in FIG. 1, in accordance with one embodiment of the present invention. As shown in FIG. 2, L2 cache 110 is divided into four sub-banks 202. However, it should be appreciated that L2 cache 110 may be divided into any suitable number of sub-banks. Further, L2 cache 110 may be any suitable size. Exemplary sizes include 1 megabytes (MB), 2 MB, 3 MB, etc. Thus, for example, if L2 cache 110 is 0.75 MB, then the size of each of the four sub-banks 202 is 192 KB. It should also be noted that center input/output (I/O) 204 is a communication channel to each sub-bank 202.

Figure 3:
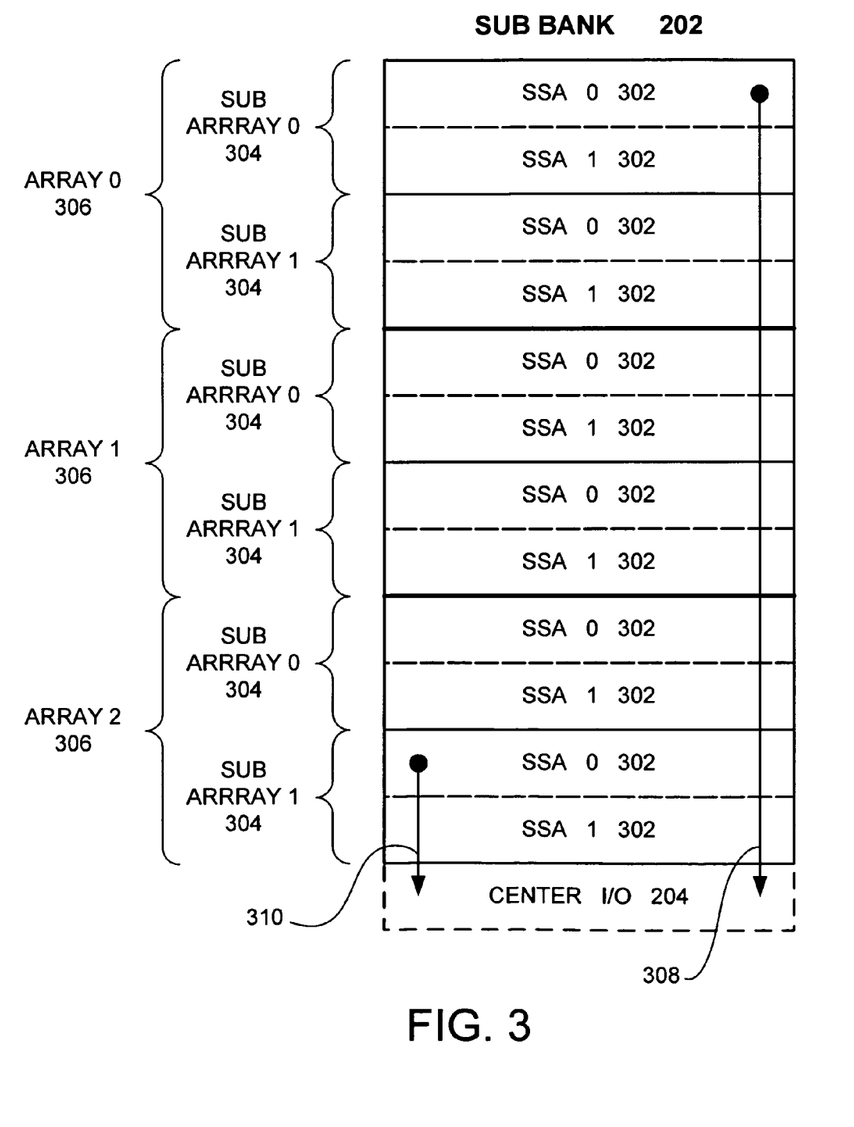
FIG. 3 is a more detailed block diagram of the sub-bank shown in FIG. 2, in accordance with one embodiment of the present invention.

FIG. 3 is a more detailed block diagram of the sub-bank shown in FIG. 2, in accordance with one embodiment of the present invention. As shown in FIG. 3, sub-bank 202 may be divided into three arrays 306. Included within each array 306 are two sub-arrays 304. Each sub-array 304 may be divided into two sub-sub-arrays (SSA) 302. The divisions of arrays 306, sub-arrays 304, and SSAs 302 shown in FIG. 3 are merely exemplary, and it should be appreciated that sub-bank 202 may be divided into any suitable subdivisions.

As discussed above, sub-bank 202 may be any suitable size. If sub-bank 202 is 192 KB, then each array 306 would be 64 kilobytes (KB). Accordingly, each sub-array 304 would be 32 KB and each SSA would be 16 KB in size. Included within each sub-bank 202 are data lines, such as data lines 308 and 310, interconnected to each SSA 302 for receiving and sending data from and to center I/O 204. For example, as shown in FIG. 3, data line 308 allows communication between SSA 0 302 of sub-array 0 304 of array 0 306 and center I/O 204. Similarly, data line 310 allows communication between SSA 0 302 of sub-array 1 304 of array 2 306 and center I/O 204. As the size of sub-bank 202 increases, the length of data lines, such as data lines 308 and 310, also increases because the sub-bank requires more arrays 306 stacked on top of each other. The length of data lines, such as data lines 308 and 310, has a direct correlation with the length of time to access data from SSAs 302. For example, the length of time to access data from SSA 0 302 of sub-array 1 304 of array 2 306 is less than one clock cycle because the length of data line 310 is relatively short. On the other hand, the length of time to access data from SSA 0 302 of sub-array 0 304 of array 0 306 may take up to two clock cycles because data line 308 is much longer in length than data line 310.

Figure 4:
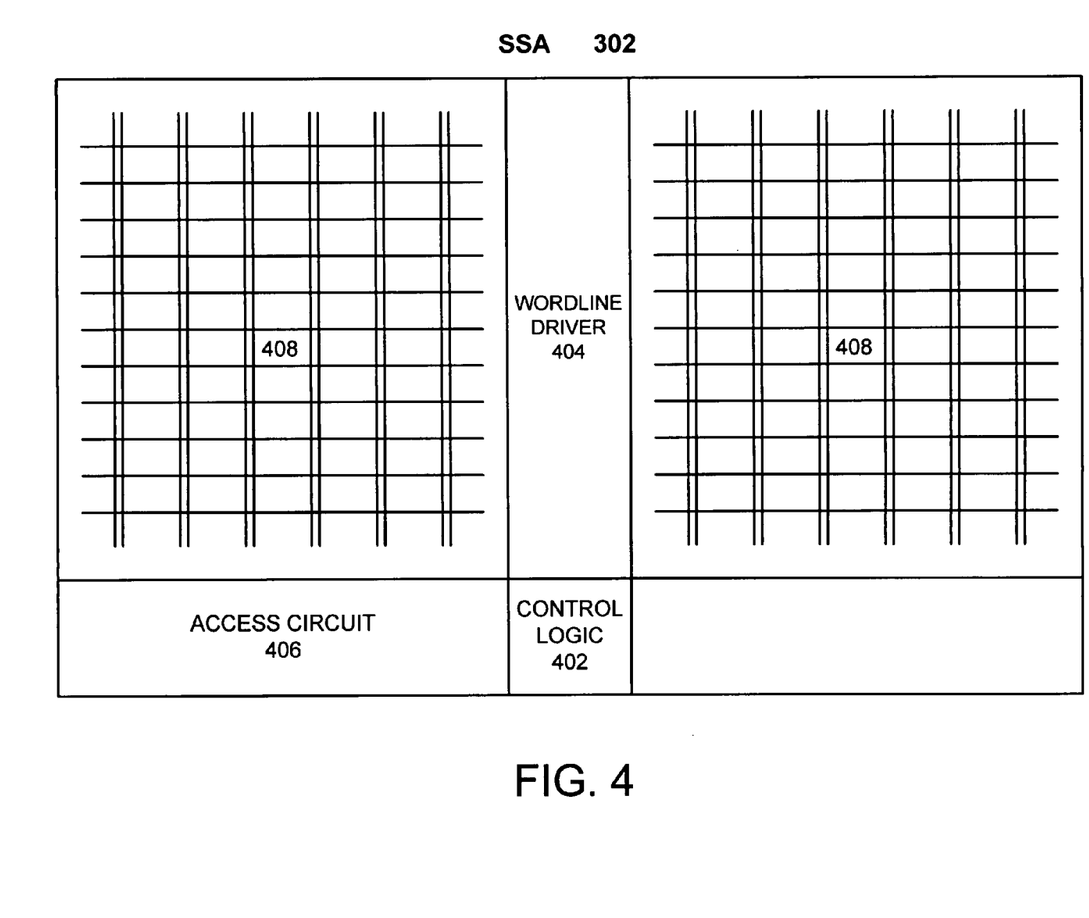
FIG. 4 is a more detailed block diagram of the sub-sub-array shown in FIG. 3, in accordance with one embodiment of the present invention.

FIG. 4 is a more detailed block diagram of the SSA shown in FIG. 3, in accordance with one embodiment of the present invention. As shown in FIG. 4, SSA 302 includes memory cells 408, wordline driver 404, and access circuit 406. One skilled in the art will appreciate that wordline driver 404 drives a selected wordline, thus allowing memory cells 408 on the selected wordline to be accessed. Access circuit 406 includes control logic 402, which may include pre-charge control, sense amplifier, read/write column select control, write amplifier control, wordline decoding, redundancy control, etc. Embodiments of the present invention may also be included within control logic 402. For example, in one embodiment, control logic 402 may additionally include circuitries for accessing data in a multicycle operations cache. Specifically, as will be explained in more detail below, control logic 402 may include circuitry for receiving requests to access data in the sub-bank and circuitry for accessing the data in the sub-bank. Additionally included is circuitry for blocking a subsequent request to access data in the sub-bank until a previous accessing of data in the same sub-bank is completed.

Figure 5:
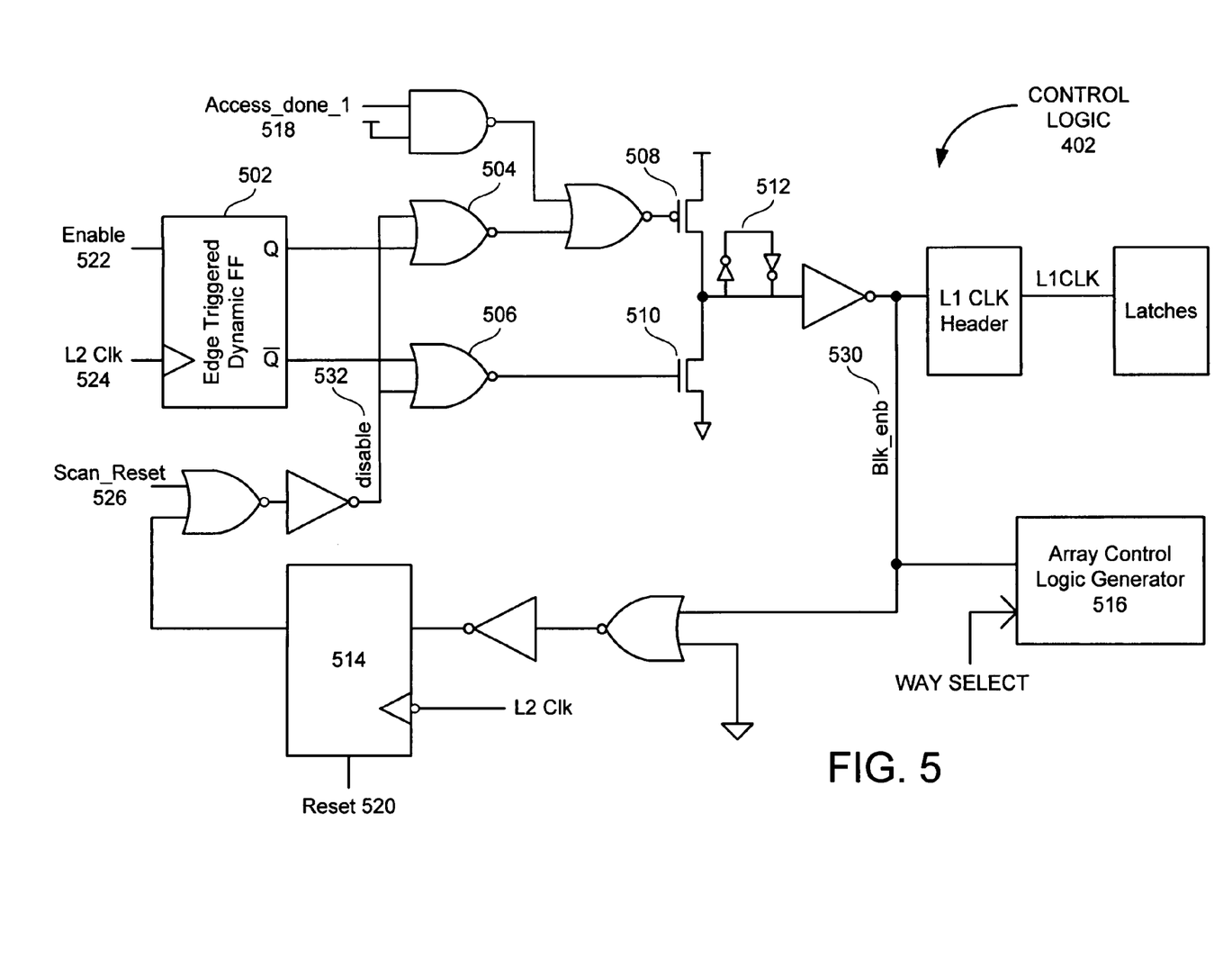
FIG. 5 is a detailed circuit schematic of the control logic shown in FIG. 4, in accordance with one embodiment of the present invention.

FIG. 5 is a detailed circuit schematic of the control logic shown in FIG. 4, in accordance with one embodiment of the present invention. As shown in FIG. 5, control logic 402 includes positive edge triggered flip-flop 502, array control logic generator 516, negative edge triggered flip-flop 514, first logic gate 504, second logic gate 506, pMOS transistor 508, nMOS transistor 510, and latch 512. Positive edge triggered flip-flop 502 may be any suitable edge triggered flip-flop that is triggered on a positive edge (0 to 1 transition). Array control logic generator 516 may include pre-charge control, sense amplifier, read/write column select control, write amplifier control, wordline decoding, redundancy control, etc. First logic gate 504 and second logic gate 506 are in communication with positive edge trigged flip-flop 502 and array control logic generator 516. First logic gate 504 and second logic gate 506 include any suitable logic gates and, in one embodiment, the first logic gate and the second logic gate are NOR gates.

Additionally, pMOS transistor 508 is in communication with first logic gate 504 and array control logic generator 516. Further, nMOS transistor 510 is in communication with second logic gate 506 and array control logic generator 516. It should be appreciated that the combination of pMOS transistor 508 and nMOS transistor 510 form a tri-state driver. Control logic 402 additionally includes negative edge triggered flip-flop 514 that is in communication with positive edge triggered flip-flop 502 and array control logic generator 516. Negative edge triggered flip-flop 514 may include any suitable edge triggered flip-flop that is triggered on a negative edge (1 to 0 transition). Additionally included is latch 512 that is in communication with pMOS transistor 508, nMOS transistor 510, and negative edge triggered flip-flop 514.

When a request to access data in a sub-bank is received, positive edge triggered flip-flop 502 receives enable signal 522 and L2 cache clock 524. The value of enable signal 522 is the sub-bank address that is being accessed. Outputs of positive edge triggered flip-flop 502, Q and Q complement, control pMOS 508 and nMOS 510, respectively. Latch 512 holds the value outputted from positive edge triggered flip-flop 502 until access to data in the SSA is complete. Thereafter, the outputted value is inverted which thereby enables block_enable signal 530. An enabled block_enable signal 530 enables (i.e. activates) array control logic generator 516 when a request to access data in the sub-bank is received. In contrast, a disabled block_enable signal 530 disables array control logic generator 516 when data in the sub-bank is not accessed. As a result, block enable signal 530 selects whether to enable or to disable array control logic generator 516. To conserve power, the sub-bank is disabled after data access is complete and is also disabled if the sub-bank is not accessed. Although array control logic generator 516 of the SSA being accessed is enabled during access of the sub-bank, the array control logic generators of the SSAs not being accessed in the same sub-bank remain disabled.

Still referring to FIG. 5, block_enable signal 530 is then inverted and received by negative edge triggered flip-flop 514. As a result, negative edge triggered flip-flop 514 enables disable signal 532 at a negative edge of a first clock cycle which, when inputted into first logic gate 504 and second logic gate 506, blocks further requests to access data in the same sub-bank until the accessing of the data initiated in the first clock cycle is completed. In one embodiment, the combination of positive edge triggered flip-flop 502 and negative edge triggered flip-flop 514 blocks requests from subsequent clock cycles to access data from the same sub-bank until access to a previous, consecutive clock cycle is completed. In other words, the combination of positive edge triggered flip-flop 502 and negative edge triggered flip-flop 514 blocks subsequent requests to access data from the sub-bank if the same sub-bank is accessed on two consecutive clock cycles.

In particular, after a request to access data is triggered at a positive edge of a first clock cycle, disable signal 532 is enabled (i.e., block enabled) by negative edge triggered flip-flop 520 at a negative edge of the first clock cycle. During this time, the data is accessed and any further requests to access data from the same sub-bank will be blocked. When access to data is complete, access_done_1 signal 518 is received which resets the circuit for a next request to access data. Specifically, during a reset, access_done_1 signal 518 precharges node to high, which resets block_enable signal 530 to low and disables array control logic generator 516, thereby reducing power consumption. The disabled block_enable signal 530 is received by negative edge triggered flip-flop 514 and the negative edge triggered flip-flop disables disable signal 532 at a negative edge of a second clock cycle, which unblocks future request to access data from the same sub-bank.

As shown in FIG. 5, circuit may additionally receive reset signal 520 and scan_reset signal 526. Reset signal 520 resets the circuit after a power-up. In effect, when reset signal 520 is received, disable signal 532 is disabled to allow requests to access data in the sub-bank. Scan_reset signal 526 resets the circuit, which disables array control logic generator 516, and is mainly used to conserve power during a scan test. For example, power supply is limited during wafer testing, and to conserve power, L2 cache may be shutdown by disabling array control logic generators 516 of the SSAs.

Figure 6:
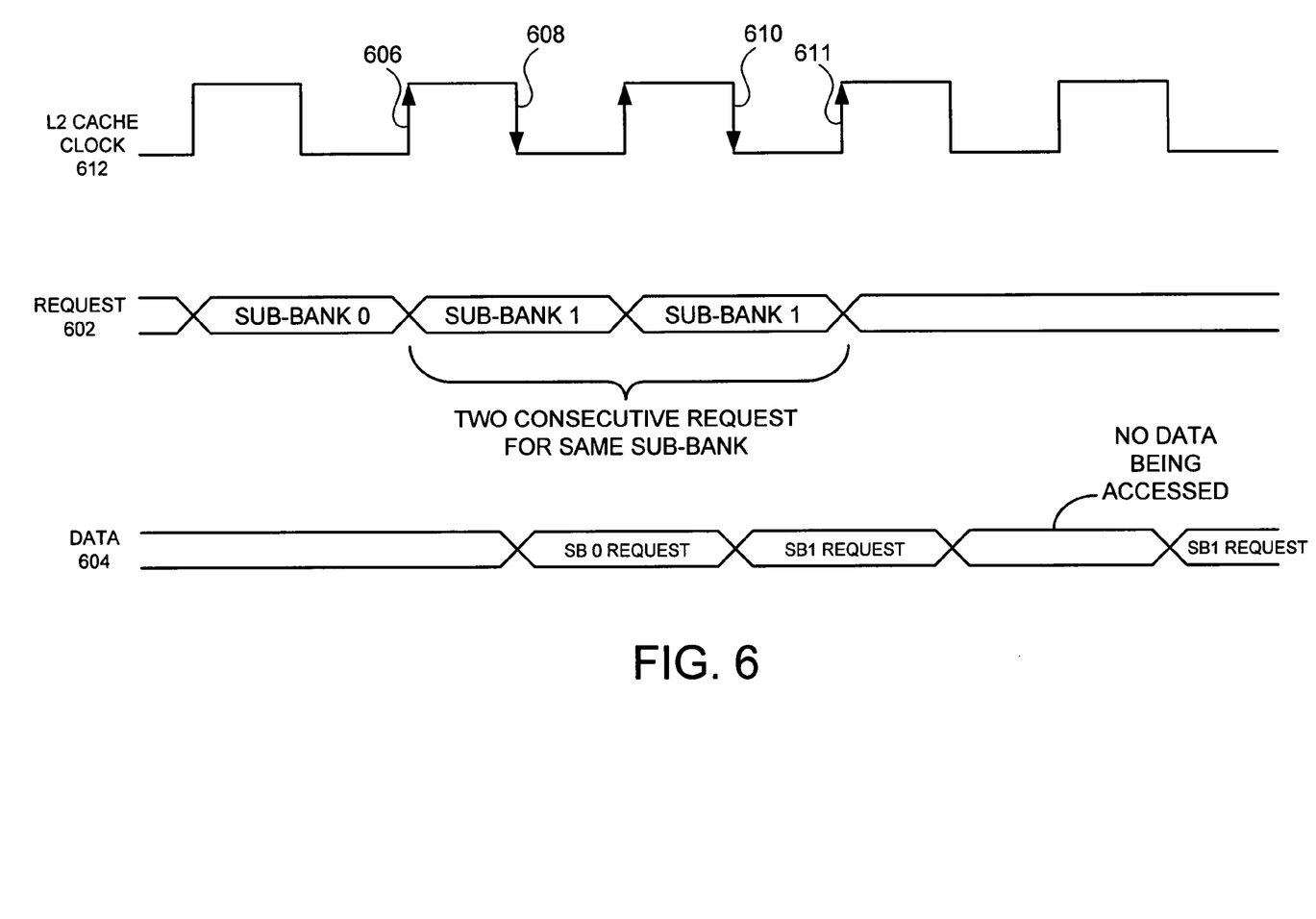
FIG. 6 shows timing diagrams of L2 cache clock, requests made to access data, and the data being accessed, in accordance with one embodiment of the present invention.

FIG. 6 shows timing diagrams of L2 cache clock, requests made to access data, and the data being accessed, in accordance with one embodiment of the present invention. FIG. 6 includes L2 cache clock timing diagram 612, requests timing diagram 602, and data timing diagram 604. L2 cache clock timing diagram 612 shows the clock pulses from an L2 cache clock. Requests timing diagram 602 shows the requests made to access data from a particular sub-bank. Data timing diagram 604 shows the data being accessed as a result of the requests.

Requests timing diagram 602 first shows that a request is made to access data from sub-bank 0. As a result of the request, data timing diagram 604 shows the access of data from sub-bank 0. Subsequently, another request is made to access data from sub-bank 1. As shown in L2 cache clock timing diagram 612, a positive edge triggered flip-flop samples a request to access sub-bank 1 at positive edge 606 of an L2 cache clock. As a result, as shown in data timing diagram 604, data from sub-bank 1 is accessed. During the access of data from sub-bank 1, another request is made to access data from sub-bank 1. As shown in request timing diagram 602, two requests have been made to access sub-bank 1 on two consecutive cycles. Therefore, the subsequent request to access data from sub-bank 1 is ignored (i.e., blocked) until access of data from the first request is completed. Thus, data timing diagram 604 shows no data being accessed when the second request is made. After access to data is complete from the first request, negative edge triggered flip flop disables a disable signal at negative edge 610 of the L2 cache clock to allow (i.e., unblock) future requests to access data from sub-bank 1. At positive edge 611 of L2 cache clock, positive edge triggered flip-flop samples the continued request to access data from sub-bank 1 and, as shown in data timing diagram 604, data is accessed again at sub-bank 1.

Figure 7:
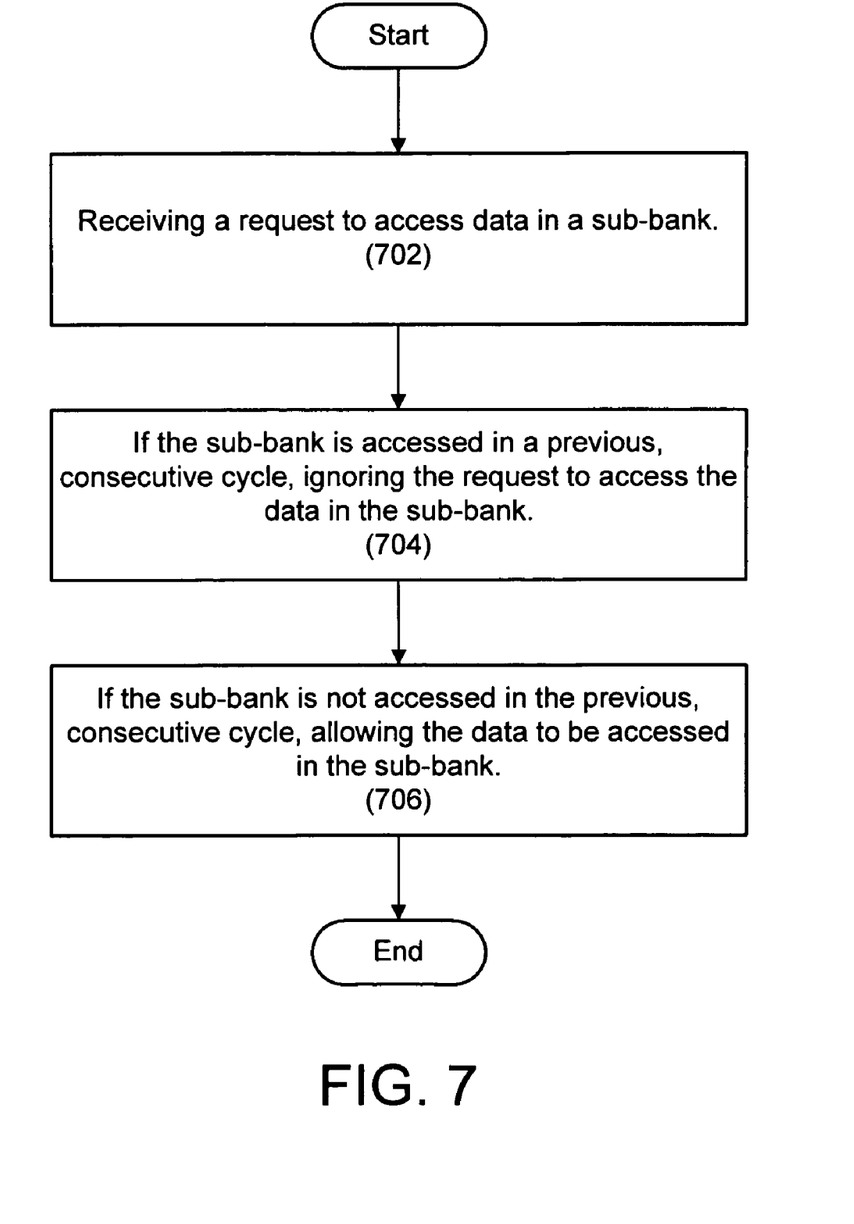
FIG. 7 is a flowchart diagram of the method operations for accessing data in a multicycle operations cache, in accordance with one embodiment of the present invention.

FIG. 7 is a flowchart diagram of the method operations for accessing data in a multicycle operations cache, in accordance with one embodiment of the present invention. Starting in operation 702, a request to access data in a sub-bank of the multicycle operations cache is received. If the sub-bank is accessed in a previous, consecutive cycle, the request to access the data in the sub-bank is ignored in operation 704. Else, if the sub-bank is not accessed in a previous, consecutive cycle, the data will be allowed to be accessed in the sub-bank in operation 706. In one embodiment, as discussed above, the combination of the positive edge triggered flip-flop and the negative edge triggered flip-flop allows subsequent, consecutive requests of the same sub-bank to be blocked. In another embodiment, a comparator may be used instead to first determine whether the sub-bank was accessed in a previous, consecutive cycle. Here, a stored sub-bank address of the sub-bank that was accessed in the previous, consecutive cycle is compared with a sub-bank address of the sub-bank receiving the request to access the data. If the sub-bank addresses match, then circuitry may be implemented to block subsequent requests.

In summary, the above described invention provides system and hardware implemented method for accessing data in a multicycle operations cache. To conserve power, the sub-banks that are not accessed are disabled. To further conserve power, within the sub-bank that is being accessed, the array controller logic generators of the SSAs not being accessed are also disabled. In addition, embodiments of the invention provide circuitry to block subsequent requests to access data from the same sub-bank until access to data from a previous, consecutive request is completed. The blocking of data prevents the corruption of data being accessed. It should be appreciated that embodiments of the present invention may be implemented in not just the L2 cache, but any suitable cache levels (e.g., L1 cache, L2 cache, L3 cache, etc.).

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A hardware implemented method for accessing data in a multicycle operations cache, comprising method operations of:
    receiving at said multicycle operations cache two successive requests for access to a first sub-bank and to a second sub-bank of the multicycle operations cache during two consecutive clock cycles;
    if the first sub-bank is different than the second sub-bank, then enabling access to said multicycle operations cache during the two consecutive clock cycles; and
    if the first sub-bank is the same as the second sub-bank then blocking requests to said second sub-bank during a middle of a first of said two consecutive clock cycles and unblocking requests to said first sub-bank during a middle of a second of said two consecutive clock cycles so that access to said second sub-bank may be achieved;
    wherein blocking further includes generating an access enabling signal, to facilitate access to said first sub-bank in response to the first of said two successive requests, upon a leading edge of a first of said two consecutive clock signals and generating a disabling signal, to preclude access to said sub-bank in response to the second of said two successive requests, upon a trailing edge of said first of said two consecutive clock signals.

2. The hardware implemented method of claim 1 wherein unblocking requests further includes generating a trailing edge enabling signal upon a trailing edge of the second of said two consecutive clock signals to facilitate access to the second sub-bank.

3. The hardware implemented method of claim 1 further including storing said remaining of said two successive requests on said multicycle operations cache while completing said first of said two successive requests.

4. The hardware implemented method of claim 3 wherein the second request of said two successive requests is latched until access to the first sub-bank is completed by control logic of said multicycle operations cache until completion of said access provided in response to the first of said two successive requests.

5. The hardware implemented method of claim 1, further comprising:
    disabling a sub-bank if the sub-bank is not accessed.

6. The hardware implemented method of claim 1, further comprising:
    enabling an array control logic generator of a sub-sub-array being accessed within a sub-bank,
    wherein array control logic generators of sub-sub-arrays of the sub-bank not being accessed remain disabled.

7. A memory chip having circuitries for accessing data in a multicycle operations cache, comprising:
    an array of storage cells;
    an array control logic generator that facilitates memory access operations between said array of storage cells and circuits outside of said array of storage cells; and
    circuitry, outside the array control logic generator and in electrical communication with said array control logic generator, to facilitate receiving multiple requests for access to common storage cells of said array of storage cells, said circuitry controlling operations of said array control logic generator to facilitate completing one of said requests while preventing said array control logic generator from facilitating completion of the remaining of said multiple requests by latching said remaining of said multiple requests,
        wherein said circuitry includes a positive edge triggered flip-flop having a first input to receive sub-bank addresses and a second input to receive a cache clock and a negative edge triggered flip-flop in communication with the positive edge triggered flip-flop, the negative edge triggered flip-flop being configured to block the second request to access the second data only if the second request is for access to the same sub-bank as the first request until the accessing of the first data is completed.

8. The memory chip of claim 7 wherein said circuitry is further configured to deactivate said array control logic generator in an absence of all requests.

9. The memory chip of claim 7 wherein said circuitry is further configured to deactivate said array control logic generator upon receiving said one of said multiple requests.

10. The memory chip of claim 7 wherein said circuitry further includes a positive edge triggered flip-flop having a first input to receive sub-bank addresses and a second input to receive a cache clock, wherein the array control logic generator is in communication with the positive edge triggered flip-flop to receive a block enable signal, the block enable signal being configured to select whether to enable or to disable the array control logic generator.

11. The memory chip of claim 7 wherein said circuitry further includes a pMOS transistor and an nMOS transistor in communication with the positive edge triggered flip-flop and the negative edge trigged flip-flop and a latch in communication with the pMOS transistor, the nMOS transistor, and the negative edge triggered flip-flop, the latch being configured to hold a previous value until access to the first data is completed.

12. The memory chip of claim 7 wherein said circuitry is further configured to store an additional of said multiple requests until completion of an earlier requests of said multiple requests.

13. A system for accessing data in a multicycle operations cache, comprising:
    a positive edge triggered flip-flop having a first input to receive sub-bank addresses and a second input to receive a cache clock;
    an array control logic generator of a sub-sub-array of a sub-bank in communication with the positive edge triggered flip-flop to receive a block enable signal, the block enable signal being configured to select whether to enable or to disable the array control logic generator; and a negative edge triggered flip-flop in communication with the positive edge triggered flip-flop, the negative edge triggered flip-flop being configured to block a request to access a second data until an accessing of a first data from a previous, consecutive clock cycle is completed only if the request to access the second data is for the same sub-bank address as the request to access the first data.

14. The system of claim 13, further comprising:

a first logic gate in communication with the positive edge triggered flip-flop and the array control logic generator, the first logic gate receiving a clock pulse output from the positive edge triggered flip-flop;

a pMOS transistor in communication with the first logic gate and the array control logic generator;

a second logic gate in communication with the positive edge triggered flip-flop and the array control logic generator, the second logic gate receiving a complementary clock pulse output from the positive edge trigged flip-flop; and an nMOS transistor in communication with the second logic gate and the array control logic generator.

15. The system of claim 14, further comprising:

a latch in communication with the pMOS transistor, the nMOS transistor, and the negative edge triggered flip-flop, the latch being configured to hold a previous value until the accessing of the first data is completed.

* * * * *